US007712601B2

(12) United States Patent
Shimomura

(10) Patent No.: US 7,712,601 B2
(45) Date of Patent: May 11, 2010

(54) ARTICLE PROCESSING SYSTEM

(75) Inventor: Takashi Shimomura, Ishikawa-Ken (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 0 days.

(21) Appl. No.: 12/321,889

(22) Filed: Jan. 27, 2009

(65) Prior Publication Data

US 2009/0208601 A1 Aug. 20, 2009

(30) Foreign Application Priority Data

Feb. 18, 2008 (JP) ............................ 2008-036453

(51) Int. Cl.
*B65G 37/00* (2006.01)

(52) U.S. Cl. ..................... 198/571; 198/575; 198/478.1

(58) Field of Classification Search .............. 198/469.1, 198/470.1, 478.1, 571, 575, 576, 577
See application file for complete search history.

(56) References Cited

U.S. PATENT DOCUMENTS 4,577,746 A * 3/1986 Tokuno et al. .............. 198/575
4,891,568 A * 1/1990 Shibata et al. .............. 198/577
5,732,944 A * 3/1998 Mayer ........................ 198/571
6,264,457 B1 * 7/2001 Ohmes et al. ............... 198/571
6,557,695 B2 * 5/2003 Gerber et al. ............ 198/473.1
6,942,086 B2 * 9/2005 Bridges et al. ........... 198/471.1
7,157,873 B2 * 1/2007 Carolan ...................... 198/571

FOREIGN PATENT DOCUMENTS

JP 63-006411 2/1988

* cited by examiner

*Primary Examiner*—James R Bidwell
(74) *Attorney, Agent, or Firm*—Flynn, Thiel, Boutell & Tanis, P.C.

(57) ABSTRACT

A star wheel H of a blow molding machine 13 constituting a blow molding line 2 as a master machine driven by a motor M is provided with an encoder E for generating a pulse depending on rotation of the star wheel H, and a filling line 3 as a slave machine driven by first to fifth servomotors SM1 to SM5 is controlled by second control means 5 based on a pulse from the encoder E. In the event of an abnormality in the blow molding line 2, the second control means 5 controls the filling line 3 based on a pulse from a pulse generator 5*a* instead of a pulse from an encoder E, and thus performs processing of a vessel retained by the filling line 3. Even in the event of an abnormality in the master machine, the slave machine can be continuously operated.

4 Claims, 2 Drawing Sheets

ARTICLE PROCESSING SYSTEM

FIELD OF THE INVENTION

The present invention relates to an article processing system, and in particular, an article processing system comprising a master machine having a revolving body and a slave machine operating in synchronization with the master machine.

DESCRIPTION OF THE PRIOR ART

Conventionally, an article processing system described in Patent document No. 1 is known, the system comprising a master machine having a revolving body, a slave machine located downstream of the master machine and for receiving an article from the master machine, a counter for generating a pulse depending on rotation of a motor for driving the master machine, and control means for receiving the pulse from the counter and synchronizing the slave machine with the master machine.

In the article processing system described in the Patent document No. 1, in case where a synchronized state between the master machine and the slave machine cannot be maintained for some reason, the control means stops both the motors of the master machine and the slave machine while synchronizing speeds of the motors thereof (from page 3, right column, line 41).

[Patent document No. 1] Japanese Patent Publication No. 63-006411

However, in the slave machine, for example, in case of a sterilization treatment performed by injecting hot water into a vessel as the article, stopping the slave machine with occurrence of an abnormality in the master machine may cause injection of hot water into the vessel for more than a predetermined time, this deforming the vessel.

SUMMARY OF THE INVENTION

In view of the above problems, the present invention is to provide an article processing system being able to control a slave machine even in the event of an abnormality in a master machine.

An article processing system according to the present invention comprises a master machine having a revolving body, a slave machine operating in synchronization with the master machine, an encoder for generating a pulse depending on rotation of the revolving body of the master machine, and control means for receiving a pulse from the encoder and synchronizing the slave machine with the master machine;

wherein the control means is provided with a pulse generator for generating a predetermined pulse;

wherein the control means controls the slave machine based on a pulse generated by the encoder during normal operating; and wherein in the event of an abnormality in the master machine, the control means controls the slave machine with a pulse generated by the pulse generator.

According to the above invention, the control means, during normal operating of the article processing system, controls the slave machine based on a pulse generated by the encoder of the master machine, while the control means, in the event of an abnormality in the master machine, can continuously control the slave machine with a pulse generated by the pulse generator, thereby allowing processing of an article retained by the slave machine.

DETAILED DESCRIPTION OF THE EMBODIMENTS

Figure 1:
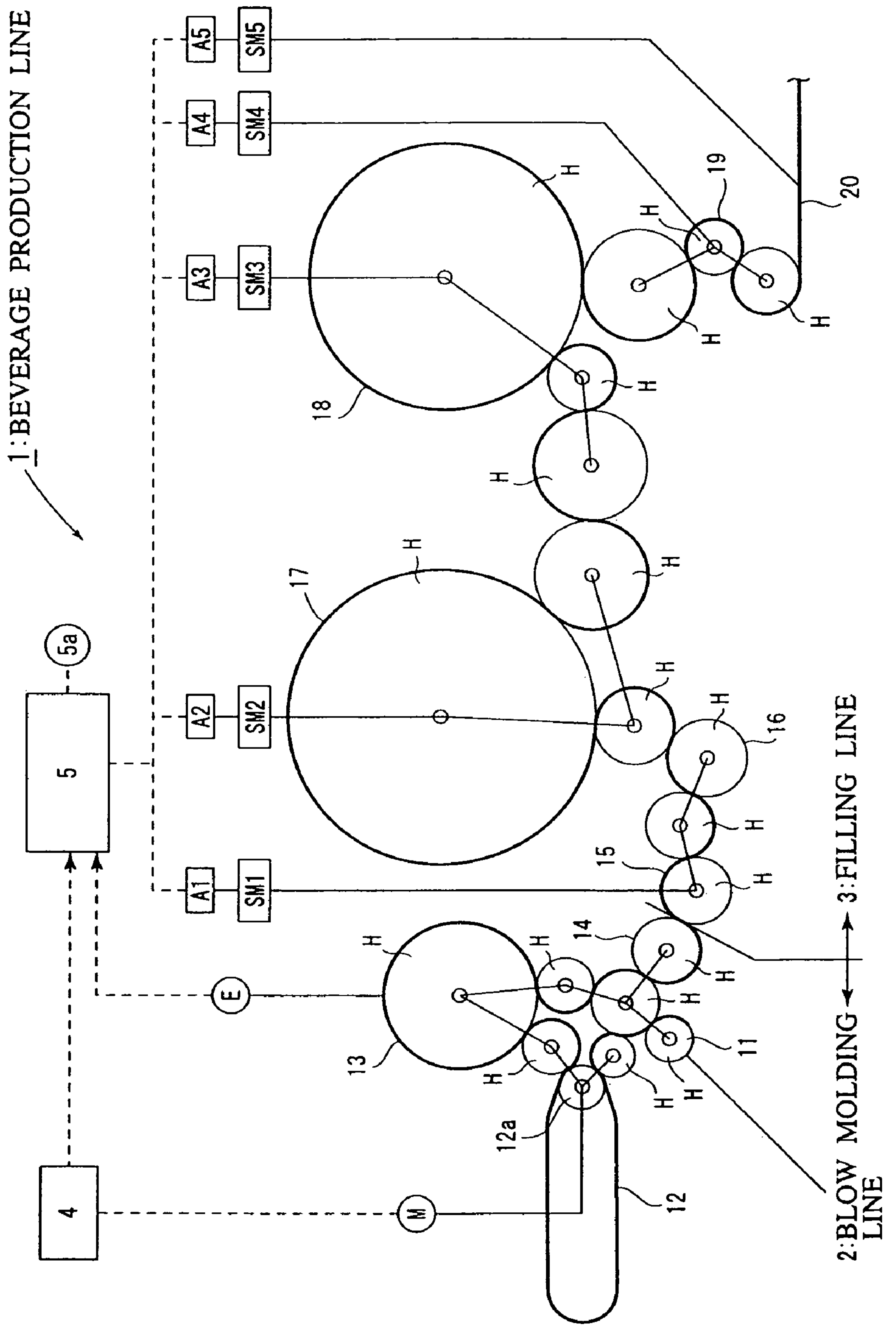
FIG. 1 shows a schematic view of a filling system according to the embodiment.

The embodiments shown in the drawings will be described below. FIG. 1 shows a beverage production line 1 as an article processing system for performing processing from molding of a PET bottle as an article to filling of a beverage, the beverage production line 1 comprising a blow molding line 2 as a master machine for blow molding a PET bottle from a parison, and a filling line 3 as a slave machine for performing processing such as cleaning of a blow molded PET bottle and filling of a beverage.

The blow molding line 2 is controlled by first control means 4 and the filling line 3 is controlled by second control means 5. The second control means 5, as described below, controls the filling line 3 so as to synchronize with the blow molding line 2 by a signal from the first control means 4 or the like.

The blow molding line 2 comprises a parison supply star wheel 11 for supplying a parison, a preheater 12 for preheating the parison, a blow molding machine 13 for blow molding a PET bottle from the parison, and a PET bottle discharge wheel 14 for delivering the PET bottle to the filling line 3, as well as a plurality of star wheels H associated with these.

The filling line 3 comprises a PET bottle receiving wheel 15 for receiving the PET bottle from the PET bottle discharge wheel 14, a sterilizer 16 for sterilizing the PET bottle, a rinser 17 for cleaning the sterilized PET bottle, a filler 18 for filling a beverage into the PET bottle, a capper 19 for installing a cap on the PET bottle, and a discharge conveyor 20 for discharging the PET bottle, as well as a plurality of star wheels H associated with these.

The preheater 12 comprises a sprocket **12*a* as its revolving body, and conveyor therein is driven by the sprocket 12*a*** to transfer a parison along a predetermined path.

The discharge conveyor 20 comprises a sprocket (not shown) as its revolving body, and its conveyor is driven by the sprocket to transfer a vessel filled with the beverage.

The other units each comprise a star wheel H as its revolving body, and each star wheel H is provided with a gripper (not shown).

Adjacent star wheels H are made such that a vessel is delivered from a gripper of an upstream star wheel H to a gripper of a downstream star wheel H in a position where the adjacent star wheels are in the vicinity of each other, while being rotated in the opposite direction from each other.

In the beverage production line 1, such a configuration causes a parison or PET bottle to be transferred along a path shown by a bold line in FIG. 1.

A detailed description about the preheater 12, the blow molding machine 13, the sterilizer 16, the rinser 17, the filler 18 and capper 19 will be omitted because the blow molding line 2 and filling line 3 are previously, publicly known per se.

The blow molding line 2 is operated in synchronism by one motor M.

Specifically, the motor drives the sprocket 12*a* of the preheater 12, and star wheels H of the other units each are rotated in synchronization through a transfer mechanism such as a shaft.

The star wheel H of the blow molding machine 13 is provided with an encoder E, the encoder E generating a pulse depending on rotation of the star wheel H of the blow molding machine 13, and second control means 5 detects a rotational speed of the star wheel H based on this pulse.

The filling line 3 is operated in synchronization by first to fifth servomotors SM1 to SM5.

Specifically, the first servomotor SM1 drives the PET bottle receiving wheel 15, rotating a star wheel H located downstream of the wheel 15 and a star wheel H of the sterilizer 16 in synchronization via a transfer mechanism.

The second servomotor SM2 drives the rinser 17 to rotate star wheels H located upstream and downstream of a star wheel H of the rinser 17 in synchronization via a transfer mechanism.

The third servomotor SM3 drives the filler 18 to rotate two star wheels H located upstream of the filler 18 in synchronization via a transfer mechanism.

The fourth servomotor SM4 drives the capper 19 to rotate a star wheel H of the capper 19 and star wheels H located upstream and downstream of the capper 19 in synchronization via a transfer mechanism.

The fifth servomotor SM5 drives a sprocket of the discharge conveyor 20.

The first to fifth servomotors SM1 to SM5 are controlled by second control means 5 via first to fifth servo amplifiers A1 to A5, respectively, and the second control means 5 controls the first to fifth servomotors SM1 to SM5 based on a pulse generated by the encoder E with which the blow molding machine 13 is provided.

Thus, operation of the blow molding line 2 by the motor M rotates the star wheel H of the blow molding machine 13 to cause encoder E to generate a pulse, and then the second control means 5 controls first to fifth servomotors SM1 to SM5 based on this pulse.

Accordingly, the PET bottle discharge wheel 14 to be rotated by the motor M and the PET bottle receiving wheel 15 to be rotated by the first servomotor SM1 are rotated in synchronization, so that a vessel is delivered form the blow molding line 2 to the filling line 3.

Figure 2A:
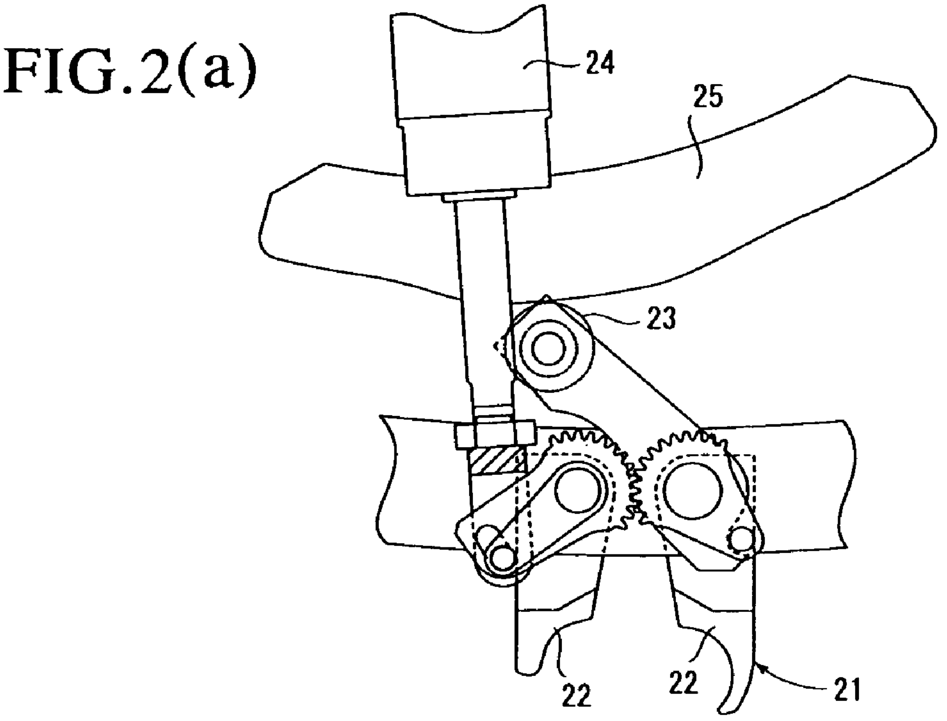
FIG. 2 is an illustration diagram of escape means provided in a gripper of a PET bottle receiving wheel, in which (a) shows a usage state of the gripper, and (b) shows an escape state by the escape means, individually.
Figure 2B:
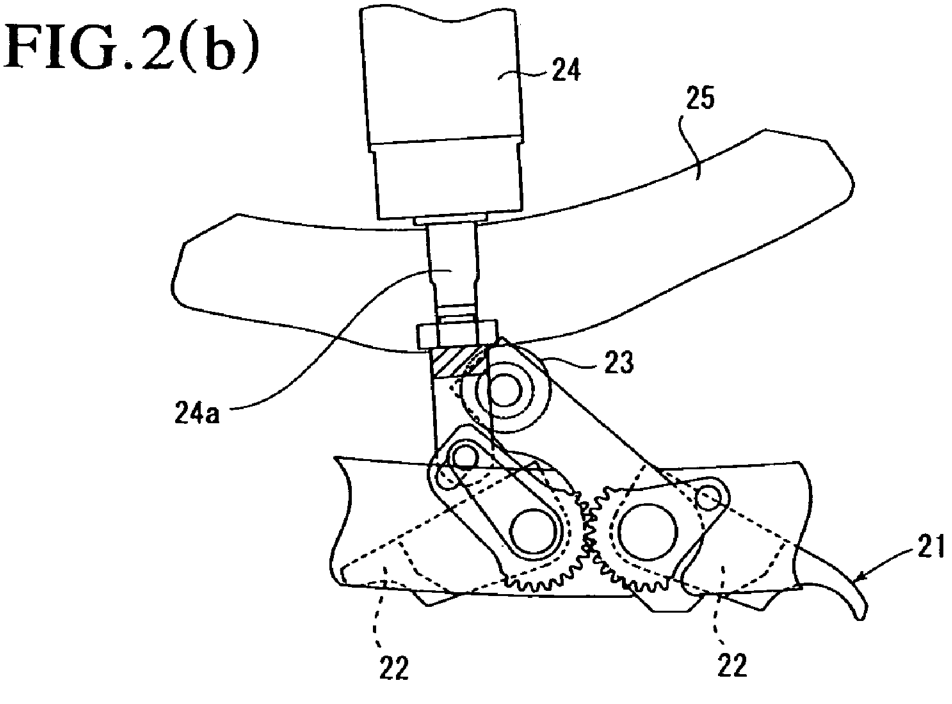

A gripper 21 of the PET bottle receiving wheel 15 provided in a position where the blow molding line 2 and the filling line 3 are adjacent comprises escape means for switching between a usage state shown in FIG. 2(*a*) and an escape state shown in FIG. 2(*b*). FIGS. 2(*a*) and (*b*) show a location where the PET bottle discharge wheel 14 and the PET bottle receiving wheel 15 are adjacent to each other and a vessel is delivered.

The gripper 21 comprises two gripping members 22 and 22 pivoted on the PET bottle receiving wheel 15 and a cam follower 23 rotatably connected to one gripping member 22 of which, in which an air cylinder 24 as the escape means is connected to the other gripping member 22 of which. A cam 25 engaging the cam follower 23 is fixed so as to prevent the rotation thereof relative to the PET bottle receiving wheel 15.

In the usage state of the gripper 21 shown in FIG. 2(*a*), the air cylinder 24 is free state, and movement of the cam follower 23 along the cam 25 outward in a radial direction of the PET bottle receiving wheel 15 changes the degree of opening of the gripping member 22 in conjunction with this movement such that the gripper 21 receive a vessel retained by the gripper of the PET bottle discharge wheel 14.

On the other hand, in the escape state of the gripper 21 shown in FIG. 2(*b*), activation of a rod 24*a* of the air cylinder 24 in a retraction direction causes the gripping members 22 and 22 to open to the maximum.

When the PET bottle receiving wheel 15 rotated in the escape state, tips of the gripping members 22 and 22 do not interfere with a vessel retained by the gripper of the PET bottle discharge wheel 14, and moreover the gripper 21 does not receive a vessel from the gripper of the PET bottle discharge wheel 14.

The above configuration of the escape means is an example, and another configuration may be used, such as a configuration in which the whole gripper is moved to the inner peripheral side of the PET bottle receiving wheel 15 by the air cylinder or the like such that the gripper does not interfere with a vessel or the like retained by the gripper of the PET bottle discharge wheel 14 in the delivery position of a vessel The second control means 5 is provided with a pulse generator 5*a* for generating a predetermined pulse.

During normal operating of the beverage production line 1, the pulse generator 5*a* receives, from the encoder E, a pulse caused by rotation of the star wheel H of the blow molding machine 13, and generates the same pulse as the received pulse.

As described in detail below, in the event of an abnormality in the blow molding line 2, the pulse generator 5*a* generates the same pulse as a pulse generated by the encoder E during normal operating.

The method for controlling the beverage production line 1 having the above configuration will be described below.

A state during normal operating of the beverage production line 1 now will be described below. The motor M is controlled by the first control means 4 to operate the blow molding line 2 as the master machine, and thus it causes the star wheel H of the blow molding machine 13 to be rotated, so that the encoder E generates a pulse.

With this, the first to fifth servomotors SM1 to SM5 are controlled by the second control means 5 to operate the filling line 3 as the slave machine, while first to fifth servomotors SM1 to SM5 are controlled by the second control means 5 based on a pulse from the encoder E.

As a result, the star wheels H or the like of the blow molding line 2 and the filling line 3 are rotated in synchronization, and then a vessel is sequentially transferred from the parison supply star wheel 11 to the discharge conveyor 20, during which molding of a PET bottle, filling of a beverage and the like are performed.

A control method performed in the event of an abnormality in the blow molding machine 13 as the master machine will now be described.

In the event of an abnormality such as defective molding of the PET bottle in the blow molding machine 13, the first control means 4 immediately stops the blow molding line 2 having the blow molding machine 13 by controlling the motor M.

Then, due to stop of the star wheel H of the blow molding machine 13 driven by the motor M, pulses are no longer generated from the encoder E with which the star wheel H of the blow molding machine 13 is provided.

On the other hand, the first control means 4 sends a signal for indicating the abnormality to the second control means 5 as soon as the abnormality occurs in the blow molding line 2, and the second control means 5, which has received the signal, switches from the previous control of the first to fifth servomotors SM1 to SM5 based on a pulse of the encoder E to a control based on a pulse generated by the pulse generator 5*a*.

Specifically, during normal operating of the blow molding line 2, the second control means 5 instructs the pulse generator 5*a* to generate the same pulse as a pulse generated by the encoder, while receiving a pulse from the encoder E and instructing the first to fifth servo amplifiers A1 to A5.

In the event of an abnormality in the blow molding machine 13, if the second control means 5 receives a signal associated with the abnormality in the blow molding line 2, the second control means 5 instructs the pulse generator 5*a* to generate a pulse in a form of the same pulse as the pulse that it has received from the encoder E.

The second control means 5, simultaneously, instructs the first to fifth servo amplifiers A1 to A5 based on a pulse generated by the pulse generator 5*a* instead of a pulse which it has received from the encoder E.

As a result, the first to fifth servomotors SM1 to SM5 drive even after the abnormality occurs in the blow molding machine 13, and therefore this prevents the filling line 3 from stopping in synchronization with the blow molding line 2 to be stopped.

Thus, for a vessel retained by the gripper 21 of the PET bottle receiving wheel 15 in the event of the abnormality in the blow molding machine 13, the filler 18 and capper 19 subsequently fill such a vessel with the beverage, and the discharge conveyor 20 discharges it as a non-defective product.

Further, in the event of an abnormality in the blow molding machine 13 and when the second control means 5 receives a signal associated with the abnormality in the blow molding line 2, the second control means 5 activates the escape means of the PET bottle receiving wheel 15 to bring the gripper 21 of the PET bottle receiving wheel 15 from the usage state shown in FIG. 2(*a*) into the escape state shown in FIG. 2(*b*).

Accordingly, the gripper 21 of the PET bottle receiving wheel 15 does not interfere with a vessel gripped by the gripper of the stopped PET bottle discharge wheel 14, the vessel is not caught therein, and therefore they prevent damage to the gripper 21.

Time required for discharging an article retained by the PET bottle receiving wheel 15 through the discharge conveyor 20 is measured in advance, and the pulse generator 5*a* generates the pulse for the measured time, and after that generates a pulse for stopping the filling line 3.

Therefore, the control means 14 stops the filling line 3 after the elapse of the time, and all vessels retained by the filling line 3 are discharged from the discharge conveyor 20.

Thus, in the event of an abnormality in the blow molding line 2 and even in case a pulse caused by rotation of the star wheel H of the blow molding machine 13 has not obtained, the filling line 3 can be continuously operated in synchronization by controlling the first to fifth servomotors SM1 to SM5 with a pulse generated from the pulse generator 5*a* with which the second control means 5 is provided.

If the filling line 3 is continuously controlled based on a pulse caused by rotation of the star wheel H of the blow molding machine 13 even after the abnormality occurs in the blow molding line 2, stop of the star wheel H of the blow molding machine 13 would result in stop of the above pulse, and therefore stop of the filling line 3 as well.

As a result, for example, in the sterilizer 16, injection of an excessive amount of a medium for sterilization causes excessive sterilization, and in the rinser 17, injection of hot water for more than a predetermined time causes deformation of PET bottles by heat, so that it is impossible to treat these PET bottles as non-defective products.

Thus, if the filling line 3 is stopped in synchronism with the blow molding line 2, a vessel which has been properly processed may become a defective product.

In the above embodiment, though the pulse generator 5*a* is designed to continue generating the same a pulse as a pulse generated by the encoder E even in the event of an abnormality in the blow molding line 2 as the master machine, another pulse may be generated.

Simultaneously with occurrence of an abnormality in the blow molding line 2, a pulse slower than a pulse generated by the encoder E, for example, may generated so as to provide operating ability slightly lower than operating ability of the filling line 3 during normal operating thereof.

The pulse generator 5*a*, then, generates the same a pulse as a pulse generated by the encoder E only for a very short period of time immediately after the abnormality occurs in the blow molding line 2, and after that it may gradually slow down the pulse.

The pulse generator 5*a* may also generate the above pulse after an abnormality occurs in the blow molding line 2 as the master machine and the pulse generator 5*a* receives an instruction from the second control means 5.

Further, in the embodiment, the blow molding line 2 and the filling line 3 are controlled by using two control means of the first control means 4 and the second control means 5, and they, however, may be controlled by one control means.

What is claimed is:

1. An article processing system, comprising a master machine having a revolving body, a slave machine operating in synchronization with the master machine, an encoder for generating a pulse depending on rotation of the revolving body of the master machine, and control means for receiving a pulse from the encoder and synchronizing the slave machine with the master machine;

wherein the control means is provided with a pulse generator for generating a predetermined pulse;

wherein the control means controls the slave machine based on a pulse generated by the encoder during normal operating of the master machine; and wherein in the event of an abnormality in the master machine, the control means controls the slave machine with a pulse generated by the pulse generator.

2. The article processing system according to claim 1, wherein in the event of an abnormality in the master machine, the pulse generator generates the same pulse as a pulse generated by the encoder during normal operating of the master machine.

3. The article processing system according to claim 1, wherein in the event of an abnormality in the master machine, the control means generates a pulse to continue the operation of the slave machine at least until the processing of an article retained by the slave machine is completed.

4. The article processing system according to claim 1, wherein star wheels, each providing with a gripper for retaining a article, are placed in the delivery position between the master machine and the slave machine, and a gripper provided in at least one of the star wheels is provided with escape means for switching between a usage state in which an article is delivered and an escape state in which the gripper provided in at least one of the star wheels does not interfere with an article retained by the other star wheel, wherein in the event of an abnormality in the master machine, the escape means is activated such that the gripper of one star wheel does not interfere with an article retained by the other star wheel.

* * * * *